United States Patent
Zacharias et al.

(10) Patent No.: US 11,856,531 B2
(45) Date of Patent: Dec. 26, 2023

(54) TECHNIQUES FOR UPLINK COMMUNICATION REROUTING IN A USER EQUIPMENT

(71) Applicant: QUALCOMM Incorporated, San Diego, CA (US)

(72) Inventors: Leena Zacharias, San Jose, CA (US); Reza Shahidi, San Diego, CA (US); Arnaud Meylan, San Diego, CA (US); Sitaramanjaneyulu Kanamarlapudi, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/450,638

(22) Filed: Oct. 12, 2021

(65) Prior Publication Data

US 2022/0116890 A1    Apr. 14, 2022

Related U.S. Application Data

(60) Provisional application No. 63/198,382, filed on Oct. 14, 2020.

(51) Int. Cl.
*H04W 52/24* (2009.01)
*H04W 52/36* (2009.01)
(Continued)

(52) U.S. Cl.
CPC ........... *H04W 52/365* (2013.01); *H04L 1/203* (2013.01); *H04W 52/243* (2013.01); *H04W 72/1263* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 9,743,288 B2 * | 8/2017 | Grosspietsch | ........ H04W 72/02 |
| 11,576,066 B2 * | 2/2023 | Wu | ........ H04W 76/25 |

(Continued)

FOREIGN PATENT DOCUMENTS

| | | | |
|---|---|---|---|
| WO | WO-2008092904 A1 | 8/2008 | |
| WO | WO-2010112066 A1 * | 10/2010 | ........... H04W 16/14 |

(Continued)

OTHER PUBLICATIONS

International Search Report and Written Opinion—PCT/US2021/071846—ISA/EPO—dated Feb. 14, 2022.

(Continued)

*Primary Examiner* — Kodzovi Acolatse
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a first configuration to perform an uplink communication using a first frequency spectrum band. The UE may receive a second configuration to receive a downlink communication using a second frequency spectrum band. The UE may determine an interference caused by at least one of the first frequency spectrum band or the second frequency spectrum band. The UE may reroute, based at least in part on the determination, the uplink communication to a first uplink path or a second uplink path associated with the first frequency spectrum band. Numerous other aspects are provided.

30 Claims, 7 Drawing Sheets

(51) Int. Cl.
    *H04L 1/20*      (2006.01)
    *H04W 72/1263*   (2023.01)
    *H04W 72/21*     (2023.01)

(56) References Cited

U.S. PATENT DOCUMENTS

| | | | |
|---|---|---|---|
| 2016/0302209 A1* | 10/2016 | Behravan | H04W 72/541 |
| 2019/0261234 A1* | 8/2019 | Park | H04W 36/0069 |
| 2019/0296881 A1* | 9/2019 | Ang | H04L 5/1469 |
| 2020/0052769 A1* | 2/2020 | Cirik | H04L 1/0026 |
| 2020/0053778 A1* | 2/2020 | Babaei | H04W 48/12 |
| 2020/0084725 A1* | 3/2020 | Vargantwar | H04W 52/143 |
| 2020/0100154 A1* | 3/2020 | Cirik | H04W 36/0072 |
| 2021/0014796 A1* | 1/2021 | Cho | H04W 52/146 |
| 2021/0014893 A1* | 1/2021 | Park | H04L 5/0057 |
| 2021/0075710 A1* | 3/2021 | Wu | H04L 43/0835 |
| 2021/0168689 A1 | 6/2021 | Shimoda et al. | |
| 2021/0337620 A1* | 10/2021 | Zhu | H04W 48/16 |
| 2022/0264486 A1* | 8/2022 | Hu | H04W 76/20 |
| 2022/0279537 A1* | 9/2022 | Freda | H04W 72/569 |
| 2022/0322078 A1* | 10/2022 | Xu | H04W 8/30 |

FOREIGN PATENT DOCUMENTS

| | | |
|---|---|---|
| WO | WO-2015168894 A1 | 11/2015 |
| WO | WO-2019131985 A1 | 7/2019 |
| WO | WO-2021062730 A1 * | 4/2021 |
| WO | WO-2021063071 A1 * | 4/2021 |

OTHER PUBLICATIONS

VIVO: "UL Path Change Conditions for Split Bearer", 3GPP Draft, 3GPP TSG-RAN WG2 Meeting #99, R2-1708505 (revision of R2-1707082)_UL Path Change Conditions for Split Bearer, 3rd Generation Partnership Project (3GPP), Mobile Competence Centre, 650, Route Des Lucioles, F-06921 Sophia-Antipolis Cedex, Fran, vol. RAN WG2, No. Berlin, Germany, Aug. 21, 2017-Aug. 25, 2017 Aug. 20, 2017 (Aug. 20, 2017), XP051318360, 2 Pages, Retrieved from the Internet: URL: http://www.3gpp.org/ftp/Meetings_3GPP_SYNC/RAN2/Docs/ [retrieved on Aug. 20, 2017] Sections 1 and 2.1.

* cited by examiner

TECHNIQUES FOR UPLINK COMMUNICATION REROUTING IN A USER EQUIPMENT

CROSS-REFERENCE TO RELATED APPLICATION

This patent application claims priority to U.S. Provisional Patent Application No. 63/198,382, filed on Oct. 14, 2020, entitled "TECHNIQUES FOR UPLINK COMMUNICATION REROUTING IN A USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for uplink communication rerouting in a user equipment.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a first configuration to perform an uplink communication using a first frequency spectrum band; receiving a second configuration to receive a downlink communication using a second frequency spectrum band; determining an interference caused by at least one of the first frequency spectrum band or the second frequency spectrum band; and rerouting, based at least in part on the determination, the uplink communication to a first uplink path or a second uplink path associated with the first frequency spectrum band.

In some aspects, the first uplink path and the second uplink path are associated with an uplink split bearer of the UE.

In some aspects, the first uplink path is an evolved universal mobile telecommunications system (UMTS) terrestrial radio access (E-UTRA) path and the second uplink path is a New Radio (NR) path.

In some aspects, the first frequency spectrum band is associated with a millimeter wave intermediate frequency or a sub-6 gigahertz frequency; and the second frequency spectrum band is associated with an ultra-wideband radar frequency.

In some aspects, the first frequency spectrum band is associated with a cellular radio access technology (RAT); and the second frequency spectrum band is associated with a radar RAT.

In some aspects, determining the interference comprises: determining that a first uplink communication associated with the first uplink path that occurs concurrently with a second uplink communication associated with the second uplink path causes a sensitivity degradation for a downlink reception at the UE for one or more band combinations with intermodulation distortion.

In some aspects, determining the interference comprises: determining a collision between a millimeter wave intermediate frequency or a sub-6 gigahertz frequency associated with a cellular RAT and an ultra-wideband radar frequency associated with a radar RAT.

In some aspects, rerouting the uplink communication comprises: rerouting, for one or more coexistence band combinations, the uplink communication to the first uplink path based at least in part on the determination of the interference, wherein a primary uplink path is set to the first uplink path and an uplink data split threshold is set to a maximum value.

In some aspects, rerouting the uplink communication comprises: rerouting, for one or more coexistence band combinations, the uplink communication to the second uplink path based at least in part on the determination of the interference, wherein a primary uplink path is set to the second uplink path and an uplink data split threshold is set to a maximum value.

In some aspects, a power backoff is enabled for the second uplink path, and the uplink communication is rerouted to the first uplink path to protect an uplink from the power backoff associated with the second uplink path.

In some aspects, a power backoff is not enabled for the second uplink path, and the uplink communication is rerouted to the first uplink path to protect a downlink from sensitivity degradation.

In some aspects, rerouting the uplink communication comprises: rerouting the uplink communication to the first uplink path for a bearer associated with an application executing on the UE that outputs the uplink communication, and when a power backoff is enabled for the second uplink path.

In some aspects, rerouting the uplink communication comprises: rerouting the uplink communication to the first uplink path or the second uplink path based at least in part on one or more bearers associated with the UE, and when a power backoff is disabled for the second uplink path.

In some aspects, rerouting the uplink communication comprises: rerouting the uplink communication to the first uplink path when the one or more bearers includes a master cell group bearer.

In some aspects, rerouting the uplink communication comprises: rerouting the uplink communication to the second uplink path when the one or more bearers includes a secondary cell group bearer.

In some aspects, rerouting the uplink communication comprises: measuring a downlink scheduling rate on one or more links for a split bearer associated with an application executing on the UE that outputs the uplink communication; measuring an uplink scheduling rate on one or more links for a plurality of split bearers associated with the UE; and rerouting the uplink communication to the first uplink path when the downlink scheduling rate associated with the split bearer satisfies a downlink scheduling threshold on a downlink path and the uplink scheduling rate satisfies an uplink scheduling threshold on the second uplink path.

In some aspects, rerouting the uplink communication comprises: measuring a downlink scheduling rate on one or more links for a split bearer associated with an application executing on the UE that outputs the uplink communication; measuring an uplink scheduling rate on one or more links for a plurality of split bearers associated with the UE; and rerouting the uplink communication to the second uplink path when the downlink scheduling rate associated with the split bearer satisfies a downlink scheduling threshold on a downlink path and the uplink scheduling rate satisfies an uplink scheduling threshold on the first uplink path.

In some aspects, rerouting the uplink communication comprises: rerouting the uplink communication to the first uplink path or the second uplink path based at least in part on a higher estimated link throughput, wherein the higher estimated link throughput includes a first value associated with the first uplink path and a second value associated with the second uplink path.

In some aspects, rerouting the uplink communication comprises: rerouting the uplink communication to the first uplink path based at least in part on a higher estimated link throughput; detecting that the higher estimated link throughput for the first uplink path does not satisfy a threshold; and switching the uplink communication from the first uplink path to the second uplink path.

In some aspects, rerouting the uplink communication comprises: rerouting the uplink communication to the second uplink path based at least in part on a higher estimated link throughput; detecting that the higher estimated link throughput for the second uplink path does not satisfy a threshold; and switching the uplink communication from the second uplink path to the first uplink path.

In some aspects, rerouting the uplink communication comprises: rerouting the uplink communication to the first uplink path or the second uplink path based at least in part on a block error rate (BLER) associated with one of a physical layer or a radio link control layer.

In some aspects, rerouting the uplink communication comprises: rerouting the uplink communication to the first uplink path or the second uplink path based at least in part on a measured throughput associated with the first uplink path and the second uplink path.

In some aspects, rerouting the uplink communication comprises: rerouting the uplink communication alternately on the first uplink path and the second uplink path based at least in part on a buffer status report (BSR) adjustment, wherein the BSR adjustment causes one of the first uplink path or the second uplink path to be used at a given time.

In some aspects, rerouting the uplink communication comprises: rerouting the uplink communication to the first uplink path or the second uplink path based at least in part on a BSR adjustment of the first uplink path or the second uplink path that causes the interference.

In some aspects, rerouting the uplink communication comprises: rerouting the uplink communication to the first uplink path or the second uplink path based at least in part on one or more of: uplink path preference information, an interference indication, or victim frequency information received from a client application.

In some aspects, a UE for wireless communication includes a memory and one or more processors, coupled to the memory, configured to: receive a first configuration to perform an uplink communication using a first frequency spectrum band; receive a second configuration to receive a downlink communication using a second frequency spectrum band; determine an interference caused by at least one of the first frequency spectrum band or the second frequency spectrum band; and reroute, based at least in part on the determination, the uplink communication to a first uplink path or a second uplink path associated with the first frequency spectrum band.

In some aspects, a non-transitory computer-readable medium storing a set of instructions for wireless communication includes one or more instructions that, when executed by one or more processors of a UE, cause the UE to: receive a first configuration to perform an uplink communication using a first frequency spectrum band; receive a second configuration to receive a downlink communication using a second frequency spectrum band; determine an interference caused by at least one of the first frequency spectrum band or the second frequency spectrum band; and reroute, based at least in part on the determination, the uplink communication to a first uplink path or a second uplink path associated with the first frequency spectrum band.

In some aspects, an apparatus for wireless communication includes means for receiving a first configuration to perform an uplink communication using a first frequency spectrum band; means for receiving a second configuration to receive a downlink communication using a second frequency spectrum band; means for determining an interference caused by at least one of the first frequency spectrum band or the second frequency spectrum band; and means for rerouting, based at least in part on the determination, the uplink communication to a first uplink path or a second uplink path associated with the first frequency spectrum band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
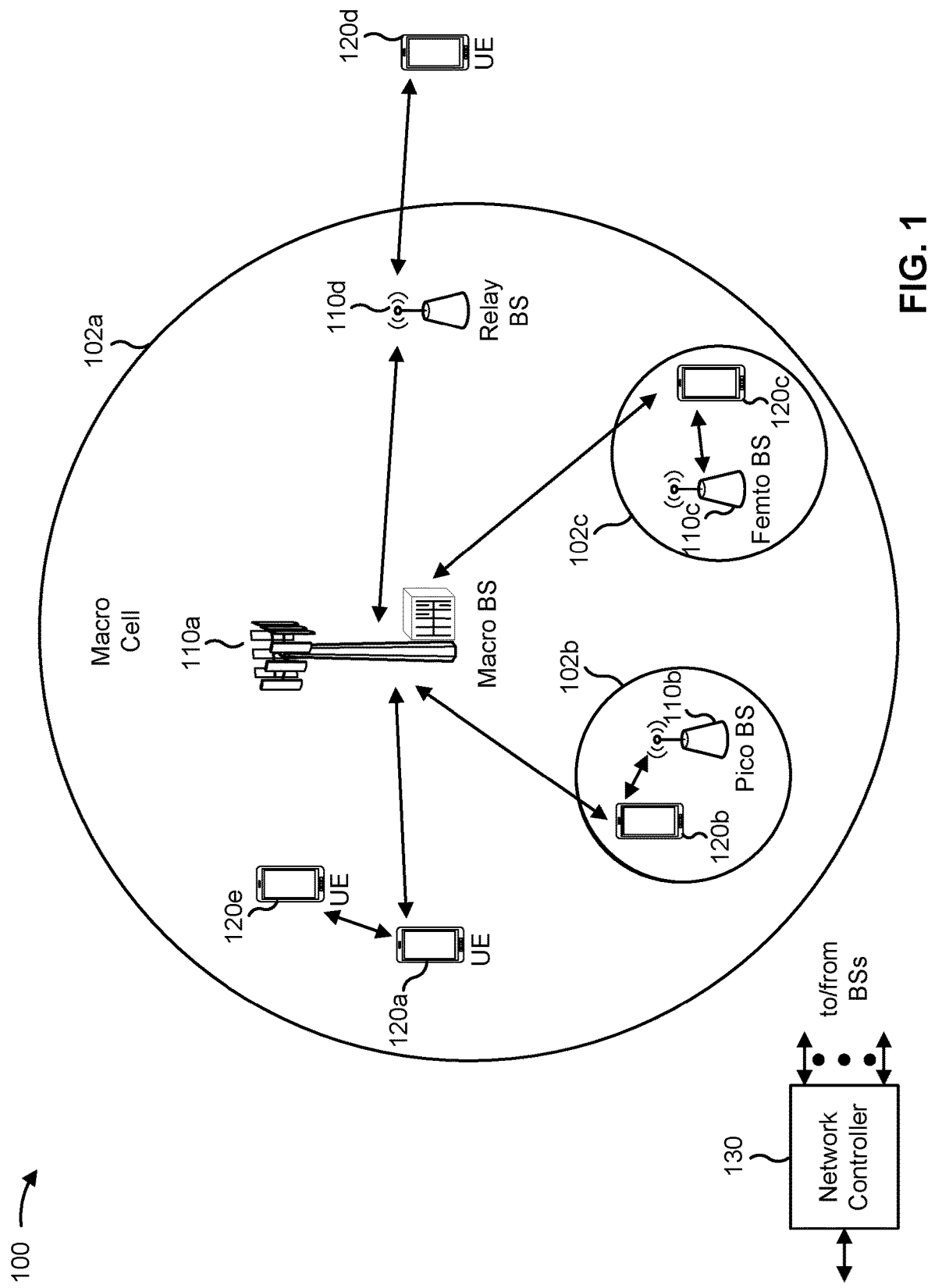
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
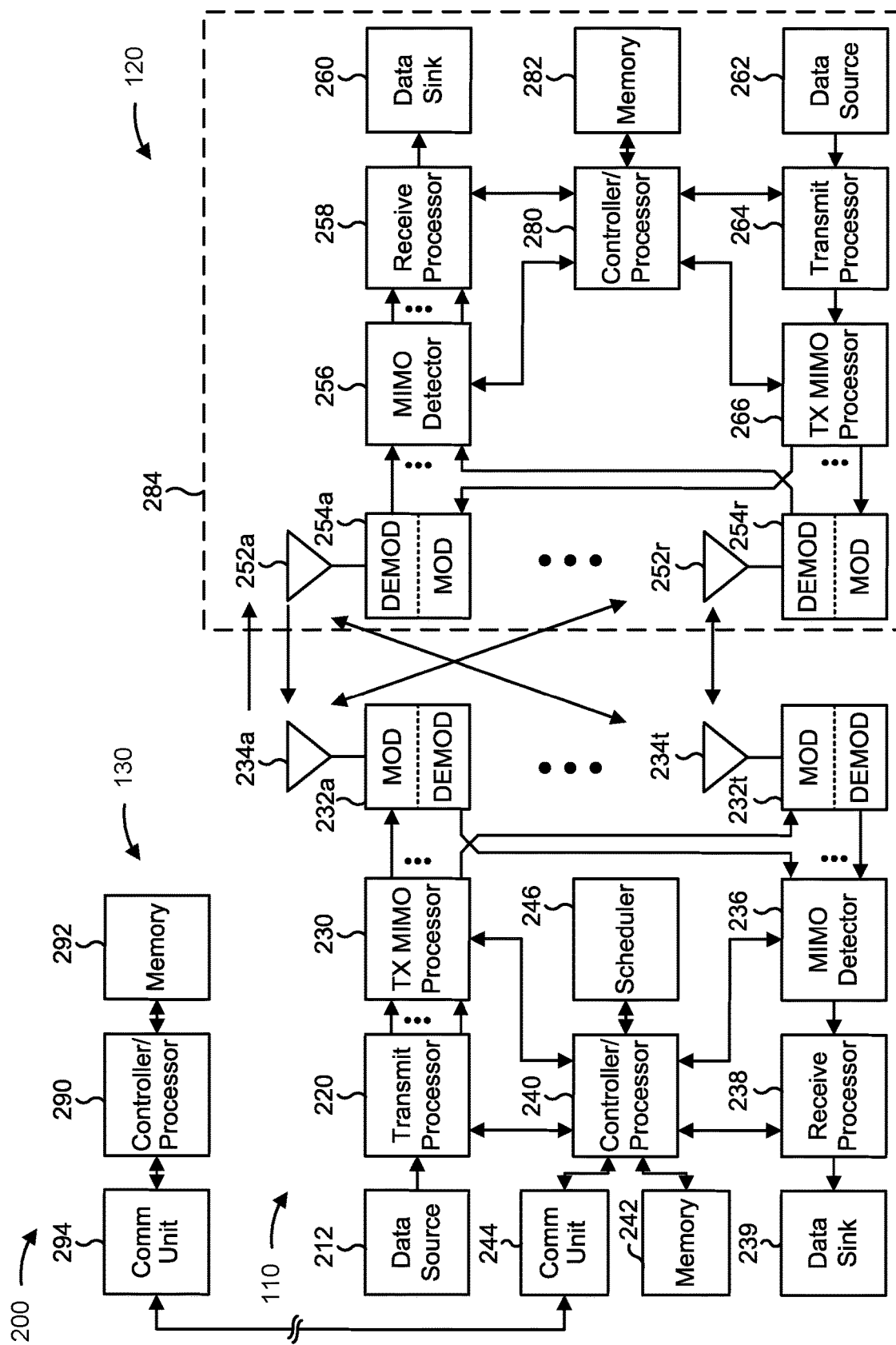
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with uplink communication rerouting in a user equipment, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some examples, executing instructions may include running the instructions, converting the instructions, compiling the instructions, and/or interpreting the instructions, among other examples.

In some aspects, UE 120 may include means for receiving a first configuration to perform an uplink communication using a first frequency spectrum band, means for receiving a second configuration to receive a downlink communication using a second frequency spectrum band, means for determining an interference caused by at least one of the first frequency spectrum band or the second frequency spectrum band, and/or means for rerouting, based at least in part on the determination, the uplink communication to a first uplink path or a second uplink path associated with the first frequency spectrum band. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

As indicated above, FIG. 2 is provided as an example. Other examples may differ from what is described with regard to FIG. 2.

Figure 3:
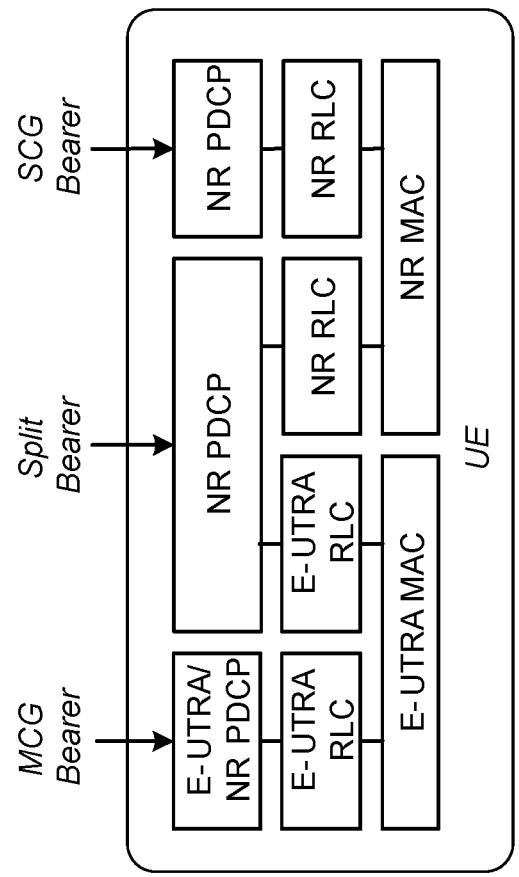
FIG. 3 is a diagram illustrating an example of a radio protocol architecture, in accordance with the present disclosure.

FIG. 3 is a diagram illustrating an example 300 of a radio protocol architecture, in accordance with the present disclosure.

As shown in FIG. 3, a radio protocol architecture for a master cell group (MCG) bearer, a secondary cell group (SCG) bearer, and a split bearer may be defined for a UE in Multi-Radio Dual Connectivity (MR-DC) with Evolved Universal Terrestrial Radio Access-New Radio (E-UTRA-NR) Dual Connectivity (EN-DC). The split bearer may be associated with an NR packet data convergence protocol (PDCP) layer, an E-UTRA radio link control (RLC) layer, and an NR RLC layer. The MCG bearer may be associated with an E-UTRA/NR PDCP layer, an E-UTRA RLC layer, and an E-UTRA medium access control (MAC) layer. The SCG bearer may be associated with an NR PDCP layer, an NR RLC layer, and an NR MAC layer.

A path associated with the E-UTRA RLC layer and/or the E-UTRA MAC layer may correspond to an LTE path or an E-UTRA path. A path associated with the NR RLC layer and/or the NR MAC layer may correspond to an NR path.

As indicated above, FIG. 3 is provided as an example. Other examples may differ from what is described with regard to FIG. 3.

A UE (e.g., UE 120) may operate in a Next Generation RAN (NG-RAN), which may support NR-NR Dual Connectivity (NR-DC), in which the UE may be connected to one gNB that acts as a master node (MN) and another gNB that acts as a secondary node (SN). In addition, NR-DC may also be used when the UE is connected to two gNB distributed units (gNB-DUs), one serving an MCG and the other serving an SCG, which may be connected to a same gNB central unit (gNB-CU), and may act as both the MN and the SN.

A network may configure a primary uplink path for a UE, on which the UE may send data when an amount of data does not satisfy a network-configured threshold. The primary uplink path may be an LTE path or an NR path. The LTE path and the NR path may be uplink signal paths. The LIE path may be referred to as a first uplink path, and the NR path may be referred to as a second uplink path. The LTE path may also be referred to as an E-UTRA path. The network-configured threshold may be an uplink data split threshold (ul-DataSplitThreshold). Uplink data for a non-standalone (NSA) uplink split bearer of the UE may be split between the LTE path and the NR path when the amount of data satisfies the network-configured threshold.

The UE may be subjected to a first coexistence, in which for band combinations with intermodulation distortion, concurrent uplink communications between the LTE path and the NR path may cause a sensitivity degradation for a downlink reception at the UE. An NR power backoff may be applied to the NR path to reduce the sensitivity degradation for the band combinations with intermodulation distortion. In other words, the power backoff may reduce or weaken an output power, thereby reducing the sensitivity degradation. The NR power backoff may occur during a voice call (e.g., a Voice over LTE (VoLTE) call) when the LTE path is a victim (e.g., the LTE path is subjected to sensitivity degradation). In this case, the LIE path may be used for the uplink communications. For other types of traffic (e.g., traffic with no power backoff but is to be protected from sensitivity degradation), the uplink communications may be performed on one link at a time, such as either on the LTE path or the NR path, but not on both the LIE path and the NR path at the same time.

The UE may be subjected to a second coexistence, in which millimeter wave intermediate frequency (mmW IF) or sub-6 GHZ high bands used by the UE may collide with ultra-wideband (UWB) radar frequencies used by the UE. The mmW IF or sub-6 GHz bands used by the UE may be associated with a cellular radio access technology (RAT) of the UE. The mmW IF or sub-6 GHz high bands used by the UE may be associated with the LTE path and/or the NR path. The UWB radar frequencies used by the UE may be associated with a radar RAT of the UE. The UWB radar frequencies may be in the 5-10 GHz range. When the mmW IF or sub-6 GHz high bands collide with the UWB radar frequencies, uplink communications that are routed on the NR path may be moved to the LTE path to reduce sensitivity degradation to the UWB radar frequencies. When the LTE path is associated with the mmW IF or sub-6 GHz high bands, the LIE path may be considered to be an aggressor (e.g., the LTE path causes the sensitivity degradation to the UWB radar frequencies), and uplink communications that are initially routed on the LTE path may be moved to the NR path.

The UE may be configured to perform uplink communications on the LTE path and the NR path based at least in part on the uplink split bearer of the UE. However, the UE may be subjected to the first coexistence when uplink communications occur on both the LTE path and the NR path at a same time, which may cause sensitivity degradation for downlink reception at the UE. Further, the UE may be configured to operate using a plurality of RATs, including a cellular RAT and a radar RAT. The UE may be subjected to the second coexistence when frequencies associated with the cellular RAT (e.g., mmW IF or sub-6 GHz high band frequencies) collide with frequencies associated with the radar RAT (e.g., UWB radar frequencies), thereby degrading performance of the UE.

In various aspects of techniques and apparatuses described herein, an uplink communication associated with an application executing on the UE may be rerouted to the LTE path or the NR path. In some aspects, the UE may reroute the uplink communication on the LTE path or the NR path based at least in part on which of the LIE path or the NR path is an aggressor with respect to the radar RAT. In some aspects, the UE may reroute the uplink communication on the LIE path or the NR path based at least in part on whether a power backoff is enabled or disabled for the NR path. In some aspects, the UE may reroute the uplink communication on the LIE path or the NR path based at least in part on a higher estimated link throughput, and/or a measured throughput. In some aspects, the UE may reroute the uplink communication on the LIE path or the NR path based at least in part on a buffer status report (BSR) adjustment mechanism. In some aspects, the UE may reroute the uplink communication on the LIE path or the NR path based at least in part on criteria received from a client application.

Figure 4:
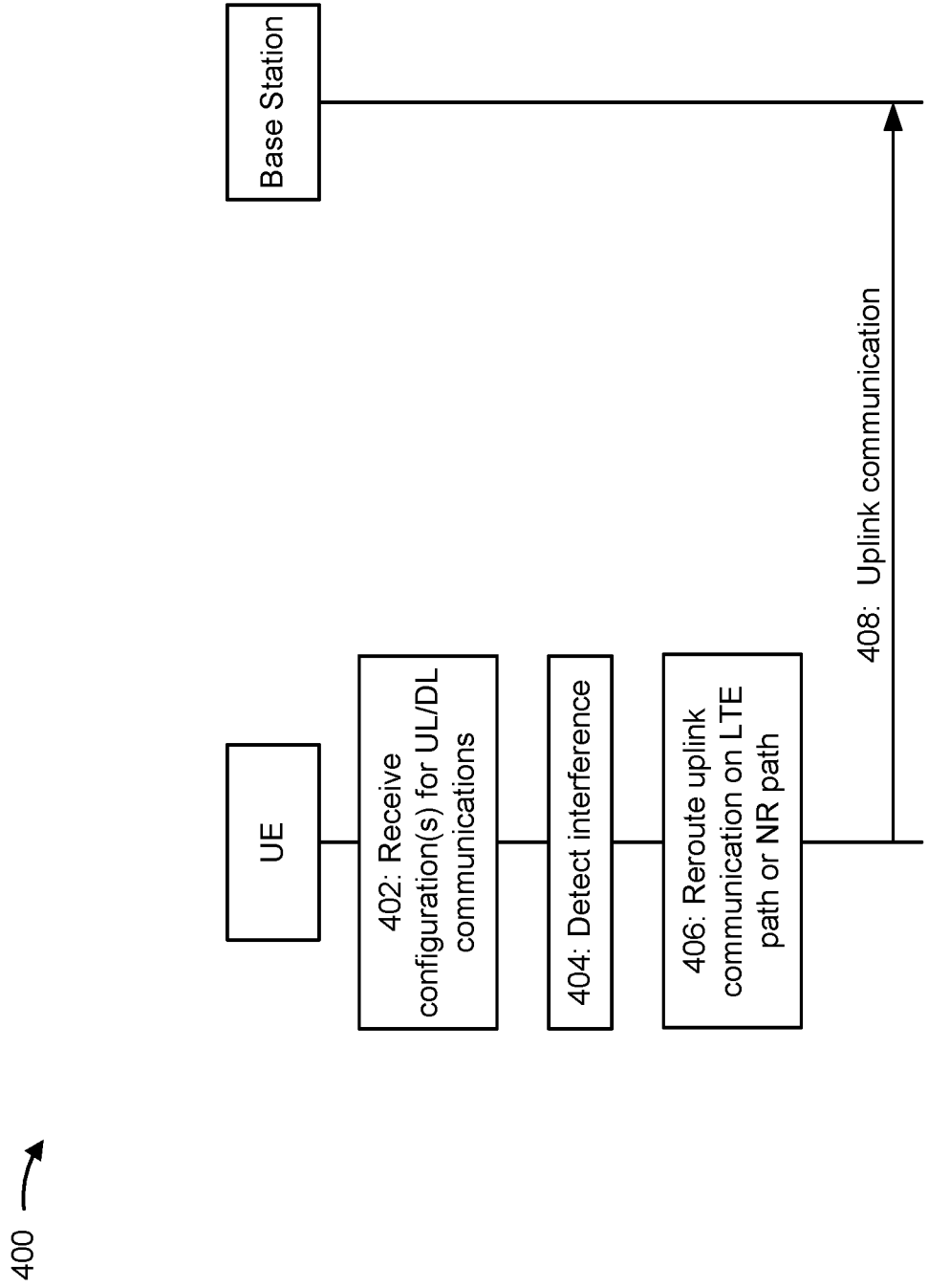
FIG. 4 is a diagram illustrating an example associated with uplink communication rerouting in a user equipment, in accordance with the present disclosure.

FIG. 4 is a diagram illustrating uplink communication rerouting in a UE, in accordance with the present disclosure. As shown in FIG. 4, example 400 includes communication between a UE (e.g., UE 120) and a base station (e.g., base station 110). In some aspects, the UE and the base station may be included in a wireless network such as wireless network 100. The UE and the base station may communicate on a wireless sidelink.

As shown by reference number 402, the UE may receive a first configuration to perform an uplink communication using a first frequency spectrum band. The uplink communication may be associated with an application executing on the UE. The UE may also receive a second configuration to receive a downlink communication using a second frequency spectrum band.

In some aspects, the first frequency spectrum band may be associated with an mmW IF or sub-6 GHz high band frequency, and the second frequency spectrum band may be associated with an UWB radar frequency. In some aspects, the first frequency spectrum band may be associated with a cellular RAT, and the second frequency spectrum band may be associated with a radar RAT.

As shown by reference number 404, the UE may determine an interference caused by at least one of the first frequency spectrum band or the second frequency spectrum band. In some aspects, the UE may determine the interference causes a sensitivity degradation for a downlink reception at the UE, based at least in part on a first uplink communication associated with an LIE path that occurs concurrently with a second uplink communication associated with an NR path. The LIE path and the NR path may be associated with the first frequency spectrum band. The LTE path and the NR path may be associated with an uplink split bearer of the UE. The UE may determine the interference for one or more band combinations with intermodulation distortion.

In some aspects, the UE may determine the interference based at least in part on a collision between the first frequency spectrum band (e.g., the mmW IF or sub-6 GHz high band) associated with the cellular RAT and the second frequency spectrum band (e.g., UWB radar band) associated with the radar RAT.

In some aspects, the interference may be associated a first coexistence between the LTE path and the NR path associated with the cellular RAT, where the LTE path and the NR path are associated with the uplink split bearer of the UE. The UE may detect the first coexistence when the first uplink transmission associated with the first uplink path occurs concurrently with the second uplink transmission associated with the second uplink path for the one or more band combinations with intermodulation distortion, thereby causing the sensitivity degradation for the downlink reception at the UE. In some aspects, the interference may be associated with a second coexistence between the cellular RAT and the radar RAT of the UE. The UE may detect the second coexistence when the collision occurs between the mmW IF or sub-6 GHz high band associated with the cellular RAT and the UWB radar frequency associated with the radar RAT.

As shown by reference number 406, the UE may reroute the uplink communication associated with the application executing on the UE to the LTE path or the NR path based at least in part on an occurrence of the interference. In some aspects, the UE may route the uplink communication on the LIE path or the NR path based at least in part on which of the LIE path or the NR path is an aggressor with respect to the radar RAT. In some aspects, the UE may route the uplink communication on the LTE path or the NR path based at least in part on whether a power backoff is enabled or disabled for the NR path. In some aspects, the UE may route the uplink communication on the LTE path or the NR path based at least in part on a higher estimated link throughput, and/or a measured throughput. In some aspects, the UE may route the uplink communication on the LTE path or the NR path based at least in part on a BSR adjustment. In some aspects, the UE may route the uplink communication on the LIE path or the NR path based at least in part on criteria received from a client application.

In some aspects, the UE may reroute the uplink communication to the LTE path based at least in part on the determination of the interference (e.g., when the LTE path or the NR path is an aggressor). A primary uplink path may be set to the LIE path and an uplink data split threshold may be set to a maximum value (e.g., infinity). In some aspects, the UE may reroute the uplink communication to the NR path based at least in part on the determination of the interference (e.g., when the LTE path or the NR path is an aggressor). A primary uplink path may be set to the NR path and the uplink data split threshold may be set to the maximum value. The UE may reroute the uplink communication to the LTE path or the NR path for one or more coexistence band combinations.

For example, a start time and an end time may be detected for uplink application data (e.g., uplink data associated with a video call). The UE may, via a modem of the UE, reroute the uplink application data on the LTE path or the NR path, depending on whether the LIE path or the NR path is the aggressor. Further, the UE may reroute the uplink application data when an uplink data split threshold is equal to the maximum value (e.g., infinity). As an example, the uplink data split threshold may be equal to the maximum value during a duration of the video call, so that the uplink application data is rerouted to the LTE path or the NR path.

In some aspects, a power backoff may be enabled for the application and/or the second uplink path, and the uplink communication may be rerouted to the LIE path to protect an uplink from the power backoff associated with the NR path. As an example, when the power backoff is enabled for a video call, uplink application data may be rerouted to the LIE path to protect the uplink from an NR power backoff and a potential error in the video call. The uplink application data may be rerouted to the LTE path for a bearer associated with the video call traffic.

In some aspects, a power backoff may not be enabled for the application and/or the second uplink path, and the uplink communication may be rerouted to the LTE path to protect a downlink from sensitivity degradation. As an example, when a video call is associated with a split bearer, uplink application data that is communicated concurrently with downlink data may be rerouted to the LTE path to protect the downlink from the sensitivity degradation caused by the concurrent uplink application data. The uplink application data may be rerouted to the LTE path for a plurality of uplink split bearers of the UE.

In some aspects, either the LTE path or the NR path may carry traffic, but not at a same time. In some cases, the traffic may be carried on the LIE path, but the NR path may be a better link than the LTE path, thereby resulting in an uplink performance degradation. Further, some secondary cell group (SCG) bearers may send uplink data on the NR path, such as radio link control (RLC) status information, and/or uplink control channel information, which may continue to cause sensitivity degradation.

In some aspects, the UE may reroute the uplink communication to the LTE path for a bearer associated with the application, and when a power backoff is enabled for the NR path. As an example, NR power backoff may be enabled to protect an uplink of application data. The UE may select the LTE path for the uplink of a split bearer associated with the application data. Since the NR power backoff may be enabled, the LIE path may be used for the split bearer carrying the application data.

In some aspects, the UE may reroute the uplink communication to the LIE path or the NR path based at least in part on one or more bearers associated with the UE, and when a power backoff is disabled for the NR path. In some aspects, the UE may reroute the uplink communication to the LTE path when the one or more bearers includes an MCG bearer. In some aspects, the UE may reroute the uplink communication to the NR path when the one or more bearers includes an SCG bearer.

As an example, NR power backoff may be disabled to protect a downlink of the application data. The UE may select the LTE path or the NR path for a plurality of split bearers based at least in part on a presence of additional bearers. For example, when the UE is associated with an MCG bearer, the UE may select the LTE path so uplink application data is rerouted on the LTE path. When the UE is associated with an SCG bearer, the UE may select the NR path so uplink application data is rerouted on the NR path. When the UE is associated with both an MCG bearer and an SCG bearer, the UE may continue to route the uplink application data to the LTE path or the NR path.

In some aspects, the UE may include split bearers, but may not include an MCG bearer or an SCG bearer. In this case, the UE may determine to reroute an uplink communication based at least in part on a downlink scheduling rate and/or an uplink scheduling rate.

In some aspects, the UE may measure a downlink scheduling rate on one or more links for a split bearer associated with the application executing on the UE. The downlink scheduling rate may indicate a percentage of time that a downlink is scheduled. The UE may measure an uplink scheduling rate on one or more links for a plurality of split bearers associated with the UE. The uplink scheduling rate may indicate a percentage of time that an uplink is scheduled. The UE may reroute the uplink communication to the LIE path when the downlink scheduling rate associated with the split bearer satisfies a downlink scheduling threshold on a downlink path and the uplink scheduling rate satisfies an uplink scheduling threshold on the NR path. Alternatively, the UE may reroute the uplink communication to the NR path when the downlink scheduling rate associated with the split bearer satisfies a downlink scheduling threshold on the downlink path and the uplink scheduling rate satisfies an uplink scheduling threshold on the LTE path.

In some aspects, the UE may measure a downlink scheduling rate on each link for a split bearer carrying application data (e.g., traffic associated with a video call). The split bearer carrying the application data may be a default bearer. The UE may measure an uplink scheduling rate on each link for a plurality of split bearers (e.g., all split bearers) of the UE. In some aspects, when the LIE path is considered a victim, and the split bearer associated with the downlink scheduling rate exceeds a downlink scheduling threshold on LIE and the uplink scheduling rate exceeds an uplink scheduling threshold on NR, the UE may reroute the application data to the LIE path. In some aspects, when the NR path is considered a victim, and the split bearer associated with the downlink scheduling rate exceeds the downlink scheduling threshold on NR and the uplink scheduling rate exceeds the uplink scheduling threshold on LIE, the UE may reroute the application data to the NR path. As an example, the downlink scheduling threshold may be 90% of packets and the uplink scheduling threshold may be 10% of packets, where the packets may be PDCP packets.

In some aspects, when a relatively equal distribution of downlink traffic is present for LIE and NR, an uplink control channel and RLC acknowledgements may be present on multiple links associated with the split bearer of the UE.

In some aspects, the UE may reroute the uplink communication to the LIE path or the NR path based at least in part on a higher estimated link throughput. The higher estimated link throughput may include a first value associated with the LIE path and a second value associated with the NR path.

As an example, the UE may select the LTE path or the NR path to be a primary uplink path based at least in part on the higher estimated link throughput. The higher estimated link throughput may provide an expected throughput that is supported on a link associated with the split bearer of the UE. A determination of the higher estimated link throughput may be based at least in part on a network scheduling. As an example, the higher estimated link throughput may be selected at a beginning of a video call, and when application data associated with the video call switches from a first uplink path to a second uplink path (e.g., from the LTE path to the NR path, or vice versa), the UE may be unable to determine an accurate estimate for the first uplink path due to no network scheduling.

In some aspects, the UE may reroute the uplink communication to the LTE path based at least in part on an estimated higher link throughput. At a later time, the UE may detect that the estimated higher link throughput for the LTE path does not satisfy a threshold. The UE may switch the uplink communication from the LTE path to the NR path. In some aspects, the UE may reroute the uplink communication to the NR path based at least in part on an estimated higher link throughput. At a later time, the UE may detect that the estimated higher link throughput for the NR path does not satisfy the threshold. The UE may switch the uplink communication from the NR path to the LTE path. In other words, the UE may blindly switch to the other uplink path (e.g., from the LTE path to the NR path, or vice versa) when a current uplink path is associated with an estimated higher link throughput that does not satisfy the threshold.

In some aspects, for an initial portion of a radio resource control (RRC) connection during which a scheduling has not begun, the UE may be unable to accurately measure the estimated higher link throughput. In this case, the UE may reroute the uplink communication to the LTE path by default.

In some aspects, the UE may reroute the uplink communication to the LIE path or the NR path based at least in part on a measured throughput associated with the LIE path and the NR path, and/or a block error rate associated with one of a physical layer or an RLC layer.

In some aspects, the UE may reroute the uplink communication alternately on the LTE path and the NR path based at least in part on a BSR adjustment, where the BSR adjustment may cause one of the LIE path or the NR path to be used at a given time. In some cases, RLC status reports may be adjusted in addition to the BSR adjustment. The BSR adjustment may involve reporting a reduced BSR from the UE to the base station, which may allow the UE to control an uplink duty cycle and reduce an uplink throughput. The UE may adjust the BSR to allow the uplink communication to be rerouted alternately on the LTE path and the NR path to avoid concurrent uplink transmissions on both links (e g, concurrent uplink transmissions on both the LIE and NR paths), which may avoid causing a sensitivity degradation for a downlink reception at the UE.

In some aspects, the UE may reroute the uplink communication to the LIE path or the NR path based at least in part on a BSR adjustment of the LIE path or the NR path that causes the interference. For example, the UE may perform the BSR adjustment on an aggressor link associated with the LTE path or the NR path, which may reduce a sensitivity degradation on a victim (e.g., the second frequency spectrum band associated with the radar RAT that is subjected to the sensitivity degradation).

In some aspects, the UE may reroute the uplink communication to the LIE path or the NR path based at least in part on uplink path preference information, an interference indication, and/or victim frequency information. The uplink path preference information, the interference indication, and/or the victim frequency information may be received from a client application or customer. The uplink path preference information may include a preferred uplink path (e.g., the LTE path or the NR path). The interference indication may indicate whether the UE is subjected to the first coexistence when uplink communications occur on both the LTE path and the NR path at a same time, and/or the second coexistence when frequencies associated with the cellular RAT (e.g., mmW IF or sub-6 GHz high band frequencies) collide with frequencies associated with the radar RAT (e.g., UWB radar frequencies). The victim frequency information may indicate a frequency that is subjected to sensitivity degradation in radar, and the UE may compute an aggressor frequency and move the uplink communication to the LTE path or the NR path accordingly.

As shown by reference number 408, the UE may perform the uplink communication with the base station. The uplink communication may be associated with uplink application data (e.g., video call traffic). For example, the uplink application data may be rerouted to the L 1E path or the NR path of the UE, and the uplink application data may be transmitted from the UE to the base station.

As indicated above, FIG. 4 is provided as an example. Other examples may differ from what is described with regard to FIG. 4.

Figure 5:
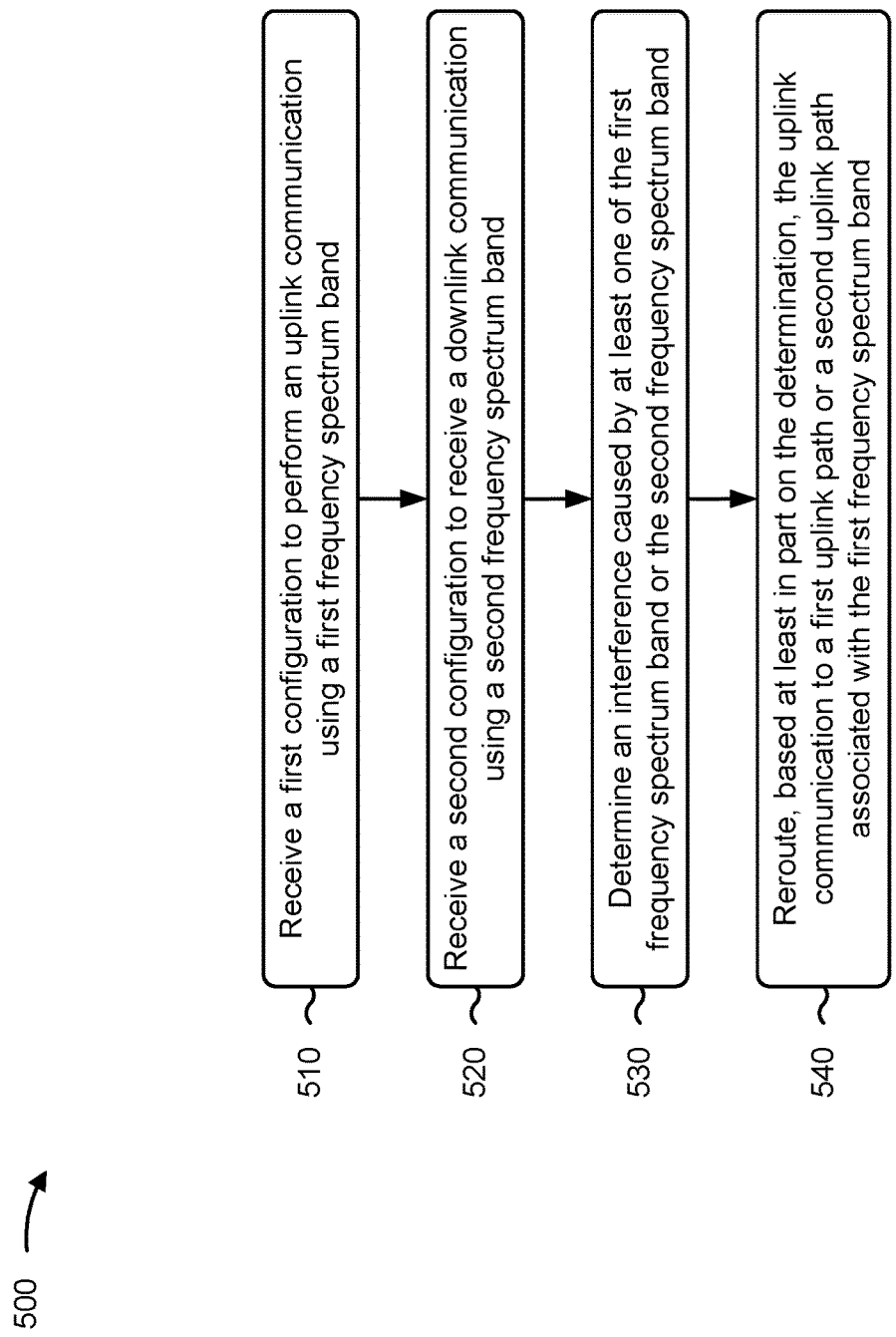
FIG. 5 is a diagram illustrating an example process associated with uplink communication rerouting in a user equipment, in accordance with the present disclosure.

FIG. 5 is a diagram illustrating an example process 500 performed, for example, by a UE, in accordance with the present disclosure. Example process 500 is an example where the UE (e.g., UE 120) performs operations associated with techniques for uplink communication rerouting in a UE.

As shown in FIG. 5, in some aspects, process 500 may include receiving a first configuration to perform an uplink communication using a first frequency spectrum band (block 510). For example, the UE (e.g., using configuration component 608, depicted in FIG. 6) may receive a first configuration to perform an uplink communication using a first frequency spectrum band, as described above.

As further shown in FIG. 5, in some aspects, process 500 may include receiving a second configuration to receive a downlink communication using a second frequency spectrum band (block 520). For example, the UE (e.g., using configuration component 608, depicted in FIG. 6) may receive a second configuration to receive a downlink communication using a second frequency spectrum band, as described above.

As further shown in FIG. 5, in some aspects, process 500 may include determining an interference caused by at least one of the first frequency spectrum band or the second frequency spectrum band (block 530). For example, the UE (e.g., using determination component 610, depicted in FIG. 6) may determine an interference caused by at least one of the first frequency spectrum band or the second frequency spectrum band, as described above.

As further shown in FIG. 5, in some aspects, process 500 may include rerouting, based at least in part on the determination, the uplink communication to a first uplink path or a second uplink path associated with the first frequency spectrum band (block 540). For example, the UE (e.g., using rerouting component 612, depicted in FIG. 6) may reroute, based at least in part on the determination, the uplink communication to a first uplink path or a second uplink path associated with the first frequency spectrum band, as described above.

Process 500 may include additional aspects, such as any single aspect or any combination of aspects described below and/or in connection with one or more other processes described elsewhere herein.

In a first aspect, the first uplink path and the second uplink path are associated with an uplink split bearer of the UE.

In a second aspect, alone or in combination with the first aspect, the first uplink path is an E-UTRA path and the second uplink path is an NR path.

In a third aspect, alone or in combination with one or more of the first and second aspects, process 500 includes the first frequency spectrum band is associated with a millimeter wave intermediate frequency or a sub-6 gigahertz frequency, and the second frequency spectrum band is associated with an ultra-wideband radar frequency.

In a fourth aspect, alone or in combination with one or more of the first through third aspects, process 600 includes the first frequency spectrum band is associated with a cellular RAT, and the second frequency spectrum band is associated with a radar RAT.

In a fifth aspect, alone or in combination with one or more of the first through fourth aspects, determining the interference comprises determining that a first uplink communication associated with the first uplink path that occurs concurrently with a second uplink communication associated with the second uplink path causes a sensitivity degradation for a downlink reception at the UE for one or more band combinations with intermodulation distortion.

In a sixth aspect, alone or in combination with one or more of the first through fifth aspects, determining the interference comprises determining a collision between a millimeter wave intermediate frequency or a sub-6 gigahertz frequency associated with a cellular RAT and an ultra-wideband radar frequency associated with a radar RAT.

In a seventh aspect, alone or in combination with one or more of the first through sixth aspects, rerouting the uplink communication comprises rerouting, for one or more coexistence band combinations, the uplink communication to the first uplink path based at least in part on the determination of the interference, wherein a primary uplink path is set to the first uplink path and an uplink data split threshold is set to a maximum value.

In an eighth aspect, alone or in combination with one or more of the first through seventh aspects, rerouting the uplink communication comprises rerouting, for one or more coexistence band combinations, the uplink communication to the second uplink path based at least in part on the determination of the interference, wherein a primary uplink path is set to the second uplink path and an uplink data split threshold is set to a maximum value.

In a ninth aspect, alone or in combination with one or more of the first through eighth aspects, a power backoff is enabled for the second uplink path, and the uplink communication is rerouted to the first uplink path to protect an uplink from the power backoff associated with the second uplink path.

In a tenth aspect, alone or in combination with one or more of the first through ninth aspects, a power backoff is not enabled for the second uplink path, and the uplink communication is rerouted to the first uplink path to protect a downlink from sensitivity degradation.

In an eleventh aspect, alone or in combination with one or more of the first through tenth aspects, rerouting the uplink communication comprises rerouting the uplink communication to the first uplink path for a bearer associated with an application executing on the UE that outputs the uplink communication, and when a power backoff is enabled for the second uplink path.

In a twelfth aspect, alone or in combination with one or more of the first through eleventh aspects, rerouting the uplink communication comprises rerouting the uplink communication to the first uplink path or the second uplink path based at least in part on one or more bearers associated with the UE, and when a power backoff is disabled for the second uplink path.

In a thirteenth aspect, alone or in combination with one or more of the first through twelfth aspects, rerouting the uplink communication comprises rerouting the uplink communication to the first uplink path when the one or more bearers includes a master cell group bearer.

In a fourteenth aspect, alone or in combination with one or more of the first through thirteenth aspects, rerouting the uplink communication comprises rerouting the uplink communication to the second uplink path when the one or more bearers includes a secondary cell group bearer.

In a fifteenth aspect, alone or in combination with one or more of the first through fourteenth aspects, rerouting the uplink communication comprises measuring a downlink scheduling rate on one or more links for a split bearer associated with an application executing on the UE that outputs the uplink communication, measuring an uplink scheduling rate on one or more links for a plurality of split bearers associated with the UE, and rerouting the uplink communication to the first uplink path when the downlink scheduling rate associated with the split bearer satisfies a downlink scheduling threshold on a downlink path and the uplink scheduling rate satisfies an uplink scheduling threshold on the second uplink path.

In a sixteenth aspect, alone or in combination with one or more of the first through fifteenth aspects, rerouting the uplink communication comprises measuring a downlink scheduling rate on one or more links for a split bearer associated with an application executing on the UE that outputs the uplink communication, measuring an uplink scheduling rate on one or more links for a plurality of split bearers associated with the UE, and rerouting the uplink communication to the second uplink path when the downlink scheduling rate associated with the split bearer satisfies a downlink scheduling threshold on a downlink path and the uplink scheduling rate satisfies an uplink scheduling threshold on the first uplink path.

In a seventeenth aspect, alone or in combination with one or more of the first through sixteenth aspects, rerouting the uplink communication comprises rerouting the uplink communication to the first uplink path or the second uplink path based at least in part on a higher estimated link throughput, wherein the higher estimated link throughput includes a first value associated with the first uplink path and a second value associated with the second uplink path.

In an eighteenth aspect, alone or in combination with one or more of the first through seventeenth aspects, rerouting the uplink communication comprises rerouting the uplink communication to the first uplink path based at least in part on a higher estimated link throughput, detecting that the higher estimated link throughput for the first uplink path does not satisfy a threshold, and switching the uplink communication from the first uplink path to the second uplink path.

In a nineteenth aspect, alone or in combination with one or more of the first through eighteenth aspects, rerouting the uplink communication comprises rerouting the uplink communication to the second uplink path based at least in part on a higher estimated link throughput, detecting that the higher estimated link throughput for the second uplink path does not satisfy a threshold, and switching the uplink communication from the second uplink path to the first uplink path.

In a twentieth aspect, alone or in combination with one or more of the first through nineteenth aspects, rerouting the uplink communication comprises rerouting the uplink communication to the first uplink path or the second uplink path based at least in part on a BLER associated with one of a physical layer or a radio link control layer.

Ina twenty-first aspect, alone or in combination with one or more of the first through twentieth aspects, rerouting the uplink communication comprises rerouting the uplink communication to the first uplink path or the second uplink path based at least in part on a measured throughput associated with the first uplink path and the second uplink path.

In a twenty-second aspect, alone or in combination with one or more of the first through twenty-first aspects, rerouting the uplink communication comprises rerouting the uplink communication alternately on the first uplink path and the second uplink path based at least in part on a BSR adjustment, wherein the BSR adjustment causes one of the first uplink path or the second uplink path to be used at a given time.

In a twenty-third aspect, alone or in combination with one or more of the first through twenty-second aspects, rerouting the uplink communication comprises rerouting the uplink communication to the first uplink path or the second uplink path based at least in part on a BSR adjustment of the first uplink path or the second uplink path that causes the interference.

In a twenty-fourth aspect, alone or in combination with one or more of the first through twenty-third aspects, rerouting the uplink communication comprises rerouting the uplink communication to the first uplink path or the second uplink path based at least in part on one or more of uplink path preference information, an interference indication, or victim frequency information received from a client application.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
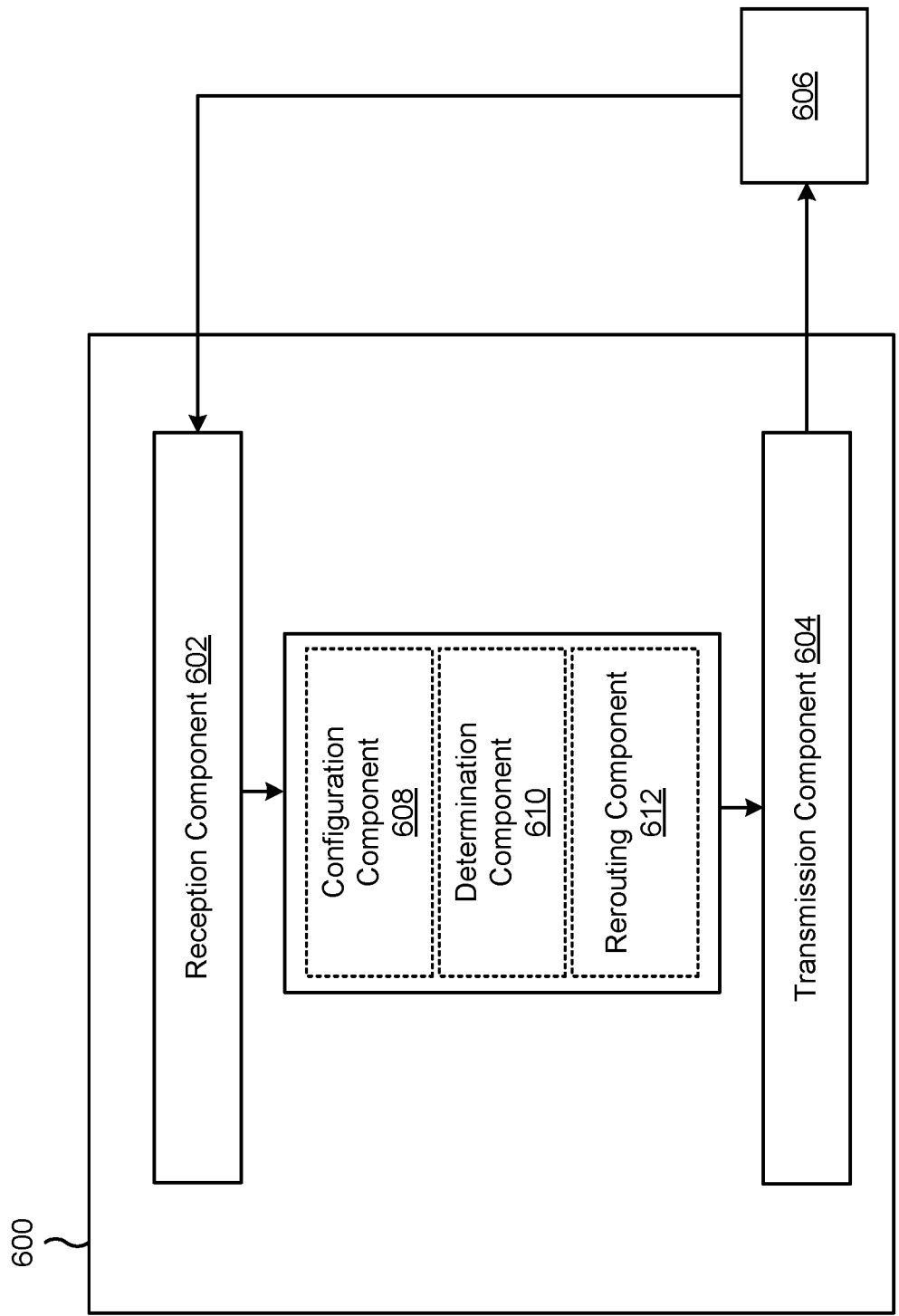
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a configuration component 608, a determination component 610, or a rerouting component 612, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The configuration component 608 may receive a first configuration to perform an uplink communication using a first frequency spectrum band. The configuration component 608 may receive a second configuration to receive a downlink communication using a second frequency spectrum band. In some aspects, the configuration component 608 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 610 may determine an interference caused by at least one of the first frequency spectrum band or the second frequency spectrum band. In some aspects, the determination component 610 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The rerouting component 612 may reroute, based at least in part on the determination, the uplink communication to a first uplink path or a second uplink path associated with the first frequency spectrum band. In some aspects, the rerouting component 612 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 610 may determine that a first uplink communication associated with the first uplink path that occurs concurrently with a second uplink communication associated with the second uplink path causes a sensitivity degradation for a downlink reception at the UE for one or more band combinations with intermodulation distortion.

The determination component 610 may determine a collision between a millimeter wave intermediate frequency or a sub-6 gigahertz frequency associated with a cellular RAT and an ultra-wideband radar frequency associated with a radar RAT.

The rerouting component 612 may reroute, for one or more coexistence band combinations, the uplink communication to the first uplink path based at least in part on the determination of the interference, wherein a primary uplink path is set to the first uplink path and an uplink data split threshold is set to a maximum value.

The rerouting component 612 may reroute, for one or more coexistence band combinations, the uplink communication to the second uplink path based at least in part on the determination of the interference, wherein a primary uplink path is set to the second uplink path and an uplink data split threshold is set to a maximum value.

The rerouting component 612 may reroute the uplink communication to the first uplink path for a bearer associated with an application executing on the UE that outputs the uplink communication, and when a power backoff is enabled for the second uplink path.

The rerouting component 612 may reroute the uplink communication to the first uplink path or the second uplink path based at least in part on one or more bearers associated with the UE, and when a power backoff is disabled for the second uplink path.

The rerouting component 612 may reroute the uplink communication to the first uplink path when the one or more bearers includes a master cell group bearer.

The rerouting component 612 may reroute the uplink communication to the second uplink path when the one or more bearers includes a secondary cell group bearer.

The rerouting component 612 may measure a downlink scheduling rate on one or more links for a split bearer associated with an application executing on the UE that outputs the uplink communication. The rerouting component 612 may measure an uplink scheduling rate on one or more links for a plurality of split bearers associated with the UE. The rerouting component 612 may reroute the uplink communication to the first uplink path when the downlink scheduling rate associated with the split bearer satisfies a downlink scheduling threshold on a downlink path and the uplink scheduling rate satisfies an uplink scheduling threshold on the second uplink path.

The rerouting component 612 may measure a downlink scheduling rate on one or more links for a split bearer associated with an application executing on the UE that outputs the uplink communication. The rerouting component 612 may measure an uplink scheduling rate on one or more links for a plurality of split bearers associated with the UE. The rerouting component 612 may reroute the uplink communication to the second uplink path when the downlink scheduling rate associated with the split bearer satisfies a downlink scheduling threshold on a downlink path and the uplink scheduling rate satisfies an uplink scheduling threshold on the first uplink path.

The rerouting component 612 may reroute the uplink communication to the first uplink path or the second uplink path based at least in part on a higher estimated link throughput, wherein the higher estimated link throughput includes a first value associated with the first uplink path and a second value associated with the second uplink path.

The rerouting component 612 may reroute the uplink communication to the first uplink path based at least in part on a higher estimated link throughput. The rerouting component 612 may detect that the higher estimated link throughput for the first uplink path does not satisfy a threshold. The rerouting component 612 may switch the uplink communication from the first uplink path to the second uplink path.

The rerouting component 612 may reroute the uplink communication to the second uplink path based at least in part on a higher estimated link throughput. The rerouting component 612 may detect that the higher estimated link throughput for the second uplink path does not satisfy a threshold. The rerouting component 612 may switch the uplink communication from the second uplink path to the first uplink path.

The rerouting component 612 may reroute the uplink communication to the first uplink path or the second uplink path based at least in part on a BLER associated with one of a physical layer or a radio link control layer.

The rerouting component 612 may reroute the uplink communication to the first uplink path or the second uplink path based at least in part on a measured throughput associated with the first uplink path and the second uplink path.

The rerouting component 612 may reroute the uplink communication alternately on the first uplink path and the second uplink path based at least in part on a BSR adjustment, wherein the BSR adjustment causes one of the first uplink path or the second uplink path to be used at a given time.

The rerouting component 612 may reroute the uplink communication to the first uplink path or the second uplink path based at least in part on a BSR adjustment of the first uplink path or the second uplink path that causes the interference.

The rerouting component 612 may reroute the uplink communication to the first uplink path or the second uplink path based at least in part on one or more of: uplink path preference information, an interference indication, or victim frequency information received from a client application.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
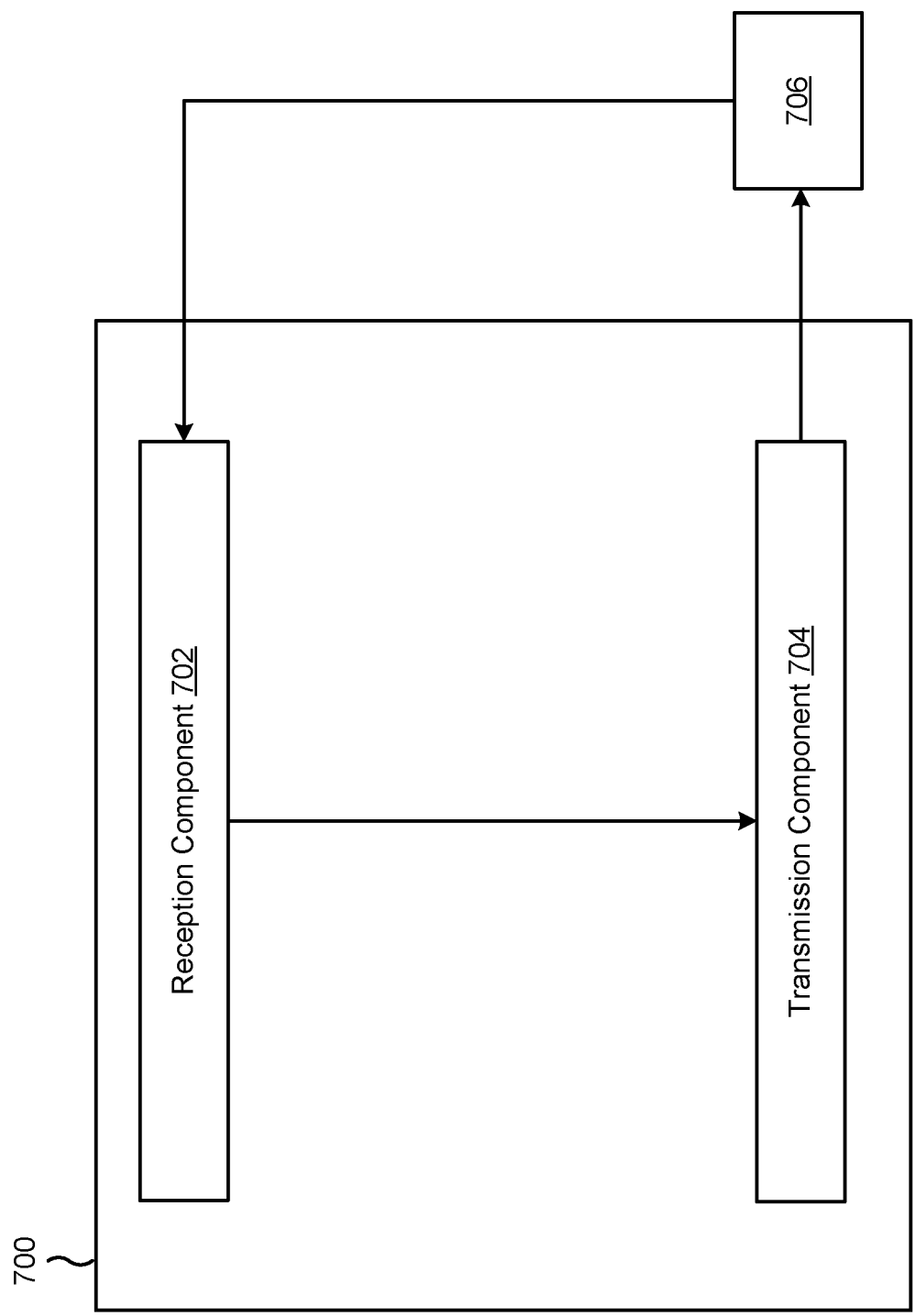

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 5. Additionally, or alternatively, the apparatus 700 may be configured to perform one or more processes described herein. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving a first configuration to perform an uplink communication using a first frequency spectrum band; receiving a second configuration to receive a downlink communication using a second frequency spectrum band; determining an interference caused by at least one of the first frequency spectrum band or the second frequency spectrum band; and rerouting, based at least in part on the determination, the uplink communication to a first uplink path or a second uplink path associated with the first frequency spectrum band.

Aspect 2: The method of Aspect 1, wherein the first uplink path and the second uplink path are associated with an uplink split bearer of the UE.

Aspect 3: The method of any of Aspects 1 through 2, wherein the first uplink path is an evolved universal mobile telecommunications system (UMTS) terrestrial radio access (E-UTRA) path and the second uplink path is a New Radio (NR) path; or the first uplink path is a first NR path and the second uplink path is a second NR path.

Aspect 4: The method of any of Aspects 1 through 3, wherein: the first frequency spectrum band is associated with a millimeter wave intermediate frequency or a sub-6 gigahertz frequency; and the second frequency spectrum band is associated with an ultra-wideband radar frequency.

Aspect 5: The method of any of Aspects 1 through 4, wherein: the first frequency spectrum band is associated with a cellular radio access technology (RAT); and the second frequency spectrum band is associated with a radar RAT.

Aspect 6: The method of any of Aspects 1 through 5, wherein determining the interference comprises: determining that a first uplink communication associated with the first uplink path that occurs concurrently with a second uplink communication associated with the second uplink path causes a sensitivity degradation for a downlink reception at the UE for one or more band combinations with intermodulation distortion.

Aspect 7: The method of any of Aspects 1 through 6, wherein determining the interference comprises: determining a collision between a millimeter wave intermediate frequency or a sub-6 gigahertz frequency associated with a cellular radio access technology (RAT) and an ultra-wideband radar frequency associated with a radar RAT.

Aspect 8: The method of any of Aspects 1 through 7, wherein rerouting the uplink communication comprises: rerouting, for one or more coexistence band combinations, the uplink communication to the first uplink path based at least in part on the determination of the interference, wherein a primary uplink path is set to the first uplink path and an uplink data split threshold is set to a maximum value.

Aspect 9: The method of any of Aspects 1 through 8, wherein rerouting the uplink communication comprises: rerouting, for one or more coexistence band combinations, the uplink communication to the second uplink path based at least in part on the determination of the interference, wherein a primary uplink path is set to the second uplink path and an uplink data split threshold is set to a maximum value.

Aspect 10: The method of any of Aspects 1 through 9, wherein a power backoff is enabled for the second uplink path, and the uplink communication is rerouted to the first uplink path to protect an uplink from the power backoff associated with the second uplink path.

Aspect 11: The method of any of Aspects 1 through 10, wherein a power backoff is not enabled for the second uplink path, and the uplink communication is rerouted to the first uplink path to protect a downlink from sensitivity degradation.

Aspect 12: The method of any of Aspects 1 through 11, wherein rerouting the uplink communication comprises: rerouting the uplink communication to the first uplink path for a bearer associated with an application executing on the UE that outputs the uplink communication, and when a power backoff is enabled for the second uplink path.

Aspect 13: The method of any of Aspects 1 through 12, wherein rerouting the uplink communication comprises: rerouting the uplink communication to the first uplink path or the second uplink path based at least in part on one or more bearers associated with the UE, and when a power backoff is disabled for the second uplink path.

Aspect 14: The method of Aspect 13, wherein rerouting the uplink communication comprises: rerouting the uplink communication to the first uplink path when the one or more bearers includes a master cell group bearer.

Aspect 15: The method of Aspect 13, wherein rerouting the uplink communication comprises: rerouting the uplink communication to the second uplink path when the one or more bearers includes a secondary cell group bearer.

Aspect 16: The method of any of Aspects 1 through 15, wherein rerouting the uplink communication comprises: measuring a downlink scheduling rate on one or more links for a split bearer associated with an application executing on the UE that outputs the uplink communication; measuring an uplink scheduling rate on one or more links for a plurality of split bearers associated with the UE; and rerouting the uplink communication to the first uplink path when the downlink scheduling rate associated with the split bearer satisfies a downlink scheduling threshold on a downlink path and the uplink scheduling rate satisfies an uplink scheduling threshold on the second uplink path.

Aspect 17: The method of any of Aspects 1 through 16, wherein rerouting the uplink communication comprises: measuring a downlink scheduling rate on one or more links for a split bearer associated with an application executing on the UE that outputs the uplink communication; measuring an uplink scheduling rate on one or more links for a plurality of split bearers associated with the UE; and rerouting the uplink communication to the second uplink path when the downlink scheduling rate associated with the split bearer satisfies a downlink scheduling threshold on a downlink path and the uplink scheduling rate satisfies an uplink scheduling threshold on the first uplink path.

Aspect 18: The method of any of Aspects 1 through 17, wherein rerouting the uplink communication comprises: rerouting the uplink communication to the first uplink path or the second uplink path based at least in part on a higher estimated link throughput, wherein the higher estimated link throughput includes a first value associated with the first uplink path and a second value associated with the second uplink path.

Aspect 19: The method of any of Aspects 1 through 18, wherein rerouting the uplink communication comprises: rerouting the uplink communication to the first uplink path based at least in part on a higher estimated link throughput; detecting that the higher estimated link throughput for the first uplink path does not satisfy a threshold; and switching the uplink communication from the first uplink path to the second uplink path.

Aspect 20: The method of any of Aspects 1 through 19, wherein rerouting the uplink communication comprises: rerouting the uplink communication to the second uplink path based at least in part on a higher estimated link throughput; detecting that the higher estimated link throughput for the second uplink path does not satisfy a threshold; and switching the uplink communication from the second uplink path to the first uplink path.

Aspect 21: The method of any of Aspects 1 through 20, wherein rerouting the uplink communication comprises: rerouting the uplink communication to the first uplink path or the second uplink path based at least in part on a block error rate (BLER) associated with one of a physical layer or a radio link control layer.

Aspect 22: The method of any of Aspects 1 through 21, wherein rerouting the uplink communication comprises: rerouting the uplink communication to the first uplink path or the second uplink path based at least in part on a measured throughput associated with the first uplink path and the second uplink path.

Aspect 23: The method of any of Aspects 1 through 22, wherein rerouting the uplink communication comprises: rerouting the uplink communication alternately on the first uplink path and the second uplink path based at least in part on a buffer status report (BSR) adjustment, wherein the BSR adjustment causes one of the first uplink path or the second uplink path to be used at a given time.

Aspect 24: The method of any of Aspects 1 through 23, wherein rerouting the uplink communication comprises: rerouting the uplink communication to the first uplink path or the second uplink path based at least in part on a buffer status report (BSR) adjustment of the first uplink path or the second uplink path that causes the interference.

Aspect 25: The method of any of Aspects 1 through 24, wherein rerouting the uplink communication comprises: rerouting the uplink communication to the first uplink path or the second uplink path based at least in part on one or more of: uplink path preference information, an interference indication, or victim frequency information received from a client application.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a first configuration to perform an uplink communication using a first frequency spectrum band;
    receiving a second configuration to receive a downlink communication using a second frequency spectrum band;
    determining a downlink interference caused by at least one of the first frequency spectrum band or the second frequency spectrum band; and
    rerouting, based at least in part on the determination of the downlink interference, the uplink communication to a first uplink path of an uplink split bearer of the UE or a second uplink path of the uplink split bearer of the UE, wherein the first uplink path and the second uplink path are associated with the first frequency spectrum band.

2. The method of claim 1, wherein:
    the first uplink path is an evolved universal mobile telecommunications system (UMTS) terrestrial radio access (E-UTRA) path and the second uplink path is a New Radio (NR) path;
    the first uplink path is a first NR path and the second uplink path is a second NR path;
    the first frequency spectrum band is associated with a millimeter wave intermediate frequency or a sub-6 gigahertz frequency, and the second frequency spectrum band is associated with an ultra-wideband radar frequency; or
    the first frequency spectrum band is associated with a cellular radio access technology (RAT), and the second frequency spectrum band is associated with a radar RAT.

3. The method of claim 1, wherein determining the downlink interference comprises:
    determining that a first uplink communication associated with the first uplink path that occurs concurrently with a second uplink communication associated with the second uplink path causes a sensitivity degradation for a downlink reception at the UE for one or more band combinations with intermodulation distortion; or
    determining a collision between a millimeter wave intermediate frequency or a sub-6 gigahertz frequency associated with a cellular radio access technology (RAT) and an ultra-wideband radar frequency associated with a radar RAT.

4. The method of claim 1, wherein rerouting the uplink communication comprises:

rerouting, for one or more coexistence band combinations, the uplink communication to the first uplink path based at least in part on the determination of the downlink interference, wherein a primary uplink path is set to the first uplink path; or rerouting, for the one or more coexistence band combinations, the uplink communication to the second uplink path based at least in part on the determination of the downlink interference, wherein the primary uplink path is set to the second uplink path.

5. The method of claim 1, wherein:
a power backoff is enabled for the second uplink path, and the uplink communication is rerouted to the first uplink path to protect an uplink from the power backoff associated with the second uplink path.

6. The method of claim 1, wherein rerouting the uplink communication comprises:
rerouting the uplink communication to the first uplink path for a bearer associated with an application executing on the UE that outputs the uplink communication, and when a power backoff is enabled for the second uplink path;
rerouting the uplink communication to the first uplink path or the second uplink path based at least in part on one or more bearers associated with the UE, and when a power backoff is disabled for the second uplink path;
rerouting the uplink communication to the first uplink path when the one or more bearers includes a master cell group bearer; or
rerouting the uplink communication to the second uplink path when the one or more bearers includes a secondary cell group bearer.

7. The method of claim 1, wherein rerouting the uplink communication comprises:
measuring a downlink scheduling rate on one or more links for a split bearer associated with an application executing on the UE that outputs the uplink communication;
measuring an uplink scheduling rate on one or more links for a plurality of split bearers associated with the UE; and
rerouting the uplink communication to the first uplink path when the downlink scheduling rate associated with the split bearer satisfies a downlink scheduling threshold on a downlink path and the uplink scheduling rate satisfies an uplink scheduling threshold on the second uplink path.

8. The method of claim 1, wherein rerouting the uplink communication comprises:
measuring a downlink scheduling rate on one or more links for a split bearer associated with an application executing on the UE that outputs the uplink communication;
measuring an uplink scheduling rate on one or more links for a plurality of split bearers associated with the UE; and
rerouting the uplink communication to the second uplink path when the downlink scheduling rate associated with the split bearer satisfies a downlink scheduling threshold on a downlink path and the uplink scheduling rate satisfies an uplink scheduling threshold on the first uplink path.

9. The method of claim 1, wherein rerouting the uplink communication comprises:
rerouting the uplink communication to the first uplink path or the second uplink path based at least in part on a higher estimated link throughput, wherein the higher estimated link throughput includes a first value associated with the first uplink path and a second value associated with the second uplink path.

10. The method of claim 9, wherein rerouting the uplink communication comprises:
rerouting the uplink communication to the first uplink path based at least in part on the first value associated with the first uplink path being associated with a higher estimated link throughput that the second value associated with the second uplink path.

11. The method of claim 9, wherein rerouting the uplink communication comprises:
rerouting the uplink communication to the second uplink path based at least in part on the second value associated with the second uplink path being associated with a higher estimated link throughput that the first value associated with the first uplink path.

12. The method of claim 1, wherein rerouting the uplink communication comprises:
rerouting the uplink communication to the first uplink path based at least in part on a higher estimated link throughput;
detecting that the higher estimated link throughput for the first uplink path does not satisfy a threshold; and
switching the uplink communication from the first uplink path to the second uplink path.

13. The method of claim 1, wherein rerouting the uplink communication comprises:
rerouting the uplink communication to the second uplink path based at least in part on a higher estimated link throughput;
detecting that the higher estimated link throughput for the second uplink path does not satisfy a threshold; and
switching the uplink communication from the second uplink path to the first uplink path.

14. The method of claim 1, wherein rerouting the uplink communication comprises:
rerouting the uplink communication to the first uplink path or the second uplink path based at least in part on a block error rate (BLER) associated with one of a physical layer or a radio link control layer.

15. The method of claim 1, wherein rerouting the uplink communication comprises:
rerouting the uplink communication to the first uplink path or the second uplink path based at least in part on a measured throughput associated with the first uplink path and the second uplink path;
rerouting the uplink communication alternately on the first uplink path and the second uplink path based at least in part on a buffer status report (BSR) adjustment, wherein the BSR adjustment causes one of the first uplink path or the second uplink path to be used at a given time;
rerouting the uplink communication to the first uplink path or the second uplink path based at least in part on the BSR adjustment of the first uplink path or the second uplink path that causes the downlink interference; or
rerouting the uplink communication to the first uplink path or the second uplink path based at least in part on one or more of: uplink path preference information, an interference indication, or victim frequency information received from a client application.

16. A user equipment (UE) for wireless communication, comprising:
one or more memories; and one or more processors coupled to the one or more memories, configured to:
receive a first configuration to perform an uplink communication using a first frequency spectrum band;
receive a second configuration to receive a downlink communication using a second frequency spectrum band;
determine a downlink interference caused by at least one of the first frequency spectrum band or the second frequency spectrum band; and
reroute, based at least in part on the determination of the downlink interference, the uplink communication to a first uplink path of an uplink split bearer of the UE or a second uplink path of the uplink split bearer of the UE, wherein the first uplink path and the second uplink path are associated with the first frequency spectrum band.

17. The UE of claim 16, wherein:
the first uplink path is an evolved universal mobile telecommunications system (UMTS) terrestrial radio access (E-UTRA) path and the second uplink path is a New Radio (NR) path;
the first uplink path is a first NR path and the second uplink path is a second NR path;
the first frequency spectrum band is associated with a millimeter wave intermediate frequency or a sub-6 gigahertz frequency, and the second frequency spectrum band is associated with an ultra-wideband radar frequency; or
the first frequency spectrum band is associated with a cellular radio access technology (RAT), and the second frequency spectrum band is associated with a radar RAT.

18. The UE of claim 16, wherein the one or more processors, when determining the downlink interference, are configured to:
determine that a first uplink communication associated with the first uplink path that occurs concurrently with a second uplink communication associated with the second uplink path causes a sensitivity degradation for a downlink reception at the UE for one or more band combinations with intermodulation distortion; or
determine a collision between a millimeter wave intermediate frequency or a sub-6 gigahertz frequency associated with a cellular radio access technology (RAT) and an ultra-wideband radar frequency associated with a radar RAT.

19. The UE of claim 16, wherein the one or more processors, when rerouting the uplink communication, are configured to:
reroute, for one or more coexistence band combinations, the uplink communication to the first uplink path based at least in part on the determination of the downlink interference, wherein a primary uplink path is set to the first uplink path; or
reroute, for the one or more coexistence band combinations, the uplink communication to the second uplink path based at least in part on the determination of the downlink interference, wherein the primary uplink path is set to the second uplink path.

20. The UE of claim 16, wherein:
a power backoff is enabled for the second uplink path, and the uplink communication is rerouted to the first uplink path to protect an uplink from the power backoff associated with the second uplink path.

21. The UE of claim 16, wherein the one or more processors, when rerouting the uplink communication, are configured to:
reroute the uplink communication to the first uplink path for a bearer associated with an application executing on the UE that outputs the uplink communication, and when a power backoff is enabled for the second uplink path;
reroute the uplink communication to the first uplink path or the second uplink path based at least in part on one or more bearers associated with the UE, and when a power backoff is disabled for the second uplink path;
reroute the uplink communication to the first uplink path when the one or more bearers includes a master cell group bearer; or
reroute the uplink communication to the second uplink path when the one or more bearers includes a secondary cell group bearer.

22. The UE of claim 16, wherein the one or more processors, when rerouting the uplink communication, are configured to:
measure a downlink scheduling rate on one or more links for a split bearer associated with an application executing on the UE that outputs the uplink communication;
measure an uplink scheduling rate on one or more links for a plurality of split bearers associated with the UE; and
reroute the uplink communication to the first uplink path when the downlink scheduling rate associated with the split bearer satisfies a downlink scheduling threshold on a downlink path and the uplink scheduling rate satisfies an uplink scheduling threshold on the second uplink path.

23. The UE of claim 16, wherein the one or more processors, when rerouting the uplink communication, are configured to:
measure a downlink scheduling rate on one or more links for a split bearer associated with an application executing on the UE that outputs the uplink communication;
measure an uplink scheduling rate on one or more links for a plurality of split bearers associated with the UE; and
reroute the uplink communication to the second uplink path when the downlink scheduling rate associated with the split bearer satisfies a downlink scheduling threshold on a downlink path and the uplink scheduling rate satisfies an uplink scheduling threshold on the first uplink path.

24. The UE of claim 16, wherein the one or more processors, when rerouting the uplink communication, are configured to:
reroute the uplink communication to the first uplink path or the second uplink path based at least in part on a higher estimated link throughput, wherein the higher estimated link throughput includes a first value associated with the first uplink path and a second value associated with the second uplink path.

25. The UE of claim 16, wherein the one or more processors, when rerouting the uplink communication, are configured to:
reroute the uplink communication to the first uplink path based at least in part on a higher estimated link throughput;
detect that the higher estimated link throughput for the first uplink path does not satisfy a threshold; and
switch the uplink communication from the first uplink path to the second uplink path.

26. The UE of claim 16, wherein the one or more processors, when rerouting the uplink communication, are configured to:
  reroute the uplink communication to the second uplink path based at least in part on a higher estimated link throughput;
  detect that the higher estimated link throughput for the second uplink path does not satisfy a threshold; and
  switch the uplink communication from the second uplink path to the first uplink path.

27. The UE of claim 16, wherein the one or more processors, when rerouting the uplink communication, are configured to:
  reroute the uplink communication to the first uplink path or the second uplink path based at least in part on a block error rate (BLER) associated with one of a physical layer or a radio link control layer.

28. The UE of claim 16, wherein the one or more processors, when rerouting the uplink communication, are configured to:
  reroute the uplink communication to the first uplink path or the second uplink path based at least in part on a measured throughput associated with the first uplink path and the second uplink path;
  reroute the uplink communication alternately on the first uplink path and the second uplink path based at least in part on a buffer status report (BSR) adjustment, wherein the BSR adjustment causes one of the first uplink path or the second uplink path to be used at a given time;
  reroute the uplink communication to the first uplink path or the second uplink path based at least in part on the BSR adjustment of the first uplink path or the second uplink path that causes the downlink interference; or
  reroute the uplink communication to the first uplink path or the second uplink path based at least in part on one or more of: uplink path preference information, an interference indication, or victim frequency information received from a client application.

29. A non-transitory computer-readable medium storing a set of instructions for wireless communication, the set of instructions comprising:
  one or more instructions that, when executed by one or more processors of a user equipment (UE), cause the UE to:
    receive a first configuration to perform an uplink communication using a first frequency spectrum band;
    receive a second configuration to receive a downlink communication using a second frequency spectrum band;
    determine a downlink interference caused by at least one of the first frequency spectrum band or the second frequency spectrum band; and
    reroute, based at least in part on the determination of the downlink interference, the uplink communication to a first uplink path of an uplink split bearer of the UE or a second uplink path of the uplink split bearer of the UE, wherein the first uplink path and the second uplink path are associated with the first frequency spectrum band.

30. An apparatus for wireless communication, comprising:
  means for receiving a first configuration to perform an uplink communication using a first frequency spectrum band;
  means for receiving a second configuration to receive a downlink communication using a second frequency spectrum band;
  means for determining a downlink interference caused by at least one of the first frequency spectrum band or the second frequency spectrum band; and
  means for rerouting, based at least in part on the determination of the downlink interference, the uplink communication to a first uplink path of an uplink split bearer of the apparats or a second uplink path of the uplink split bearer of the apparatus, wherein the first uplink path and the second uplink path are associated with the first frequency spectrum band.

* * * * *